United States Patent [19]

Yamaguchi et al.

[11] Patent Number: 5,642,970
[45] Date of Patent: Jul. 1, 1997

[54] METHOD OF PRODUCING A CURVED GROOVE IN A WORKPIECE

[75] Inventors: Yukio Yamaguchi, Okazaki; Masaaki Enya, Toyohashi; Takahiro Yamazaki, Nishio; Tatsuo Miura, Kariya, all of Japan

[73] Assignee: Nippondenso Co., Ltd., Kariya, Japan

[21] Appl. No.: 638,483

[22] Filed: Apr. 26, 1996

[30] Foreign Application Priority Data

Apr. 26, 1995 [JP] Japan .................................. 7-102357
Jan. 24, 1996 [JP] Japan .................................. 8-010358

[51] Int. Cl.$^6$ .............................. B23C 3/00; B23P 15/00
[52] U.S. Cl. ........................................ 409/132; 29/888.022
[58] Field of Search ........................ 29/888.022, 888.02; 409/131, 132

[56] References Cited

U.S. PATENT DOCUMENTS 5,103,558  4/1992  Herrick et al. .................... 29/888.022
5,122,040  6/1992  Fields ................................ 409/131
5,564,185  10/1996  Saeki et al. ..................... 29/888.022

FOREIGN PATENT DOCUMENTS

065261  8/1985  European Pat. Off. .

Primary Examiner—M. Rachuba
Assistant Examiner—Christopher Kirkman
Attorney, Agent, or Firm—Cushman, Darby & Cushman IP Group of Pillsbury Madison & Sutro LLP

[57] ABSTRACT

A method of producing, in a workpiece such as a spiral member of a scroll element, a curved groove for receiving a mechanical seal by using a milling cutter, especially, an end mill. A relative feed in a given direction "A" is provided between the milling cutter and the work, and the milling cutter rotating in a predetermined direction "B" about an axis of rotation thereof is set so that the milling cutter provides an inner side wall of the curved groove with respect to a center of curvature of the curved groove with an up milling in which the direction "B" is directed against the direction "A", and that the milling cutter provides an outer side wall of the curved groove confronting the inner side wall with a down milling in which the direction "B" is directed toward the direction "A", in order to suppress formation of coarse and rough surface on both the inner and outer side wall of the curved groove. Thus, the width of the curved groove can be constantly accurate over an entire length of the groove.

26 Claims, 10 Drawing Sheets

METHOD OF PRODUCING A CURVED GROOVE IN A WORKPIECE

BACKGROUND OF THE INVENTION

1. Field of the invention

The present invention generally relates to a method of producing, in a workpiece, a groove extending along a curve such as a spirally extending curve by using a milling cutter, e.g., an end mill. The curved groove is intended for use in receiving a mechanical seal. More particularly, the present invention relates to a method of cutting a curved groove in a metallic workpiece, adapted for forming an involute-curve groove in a spiral portion of a scroll member which is an indispensable element of scroll-type fluid machines including fluid compressors and fluid expanders.

2. Description of the Related Art

Figure 12:
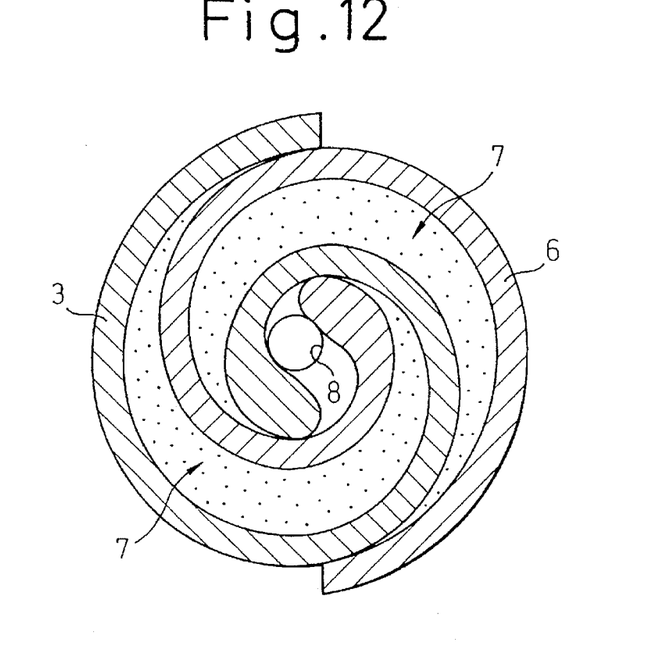
FIG. 12 is a cross-sectional view of stationary and movable scroll elements of a scroll type fluid compressor to which a method of producing a curved groove in a workpiece according to the present invention is applied.
Figure 13:
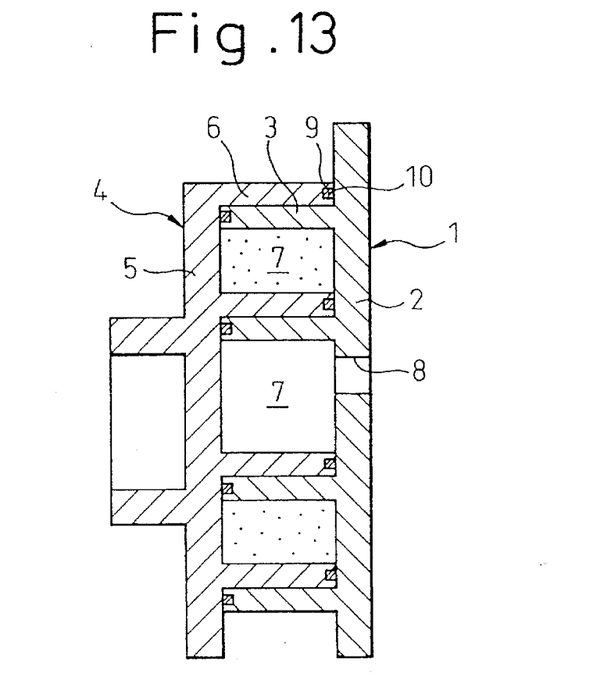
FIG. 13 is a cross-sectional view of the stationary and movable scroll elements of the scroll the fluid compressor, illustrating an enlarged condition of the stationary and movable scroll elements.
Figures 14, 14A:
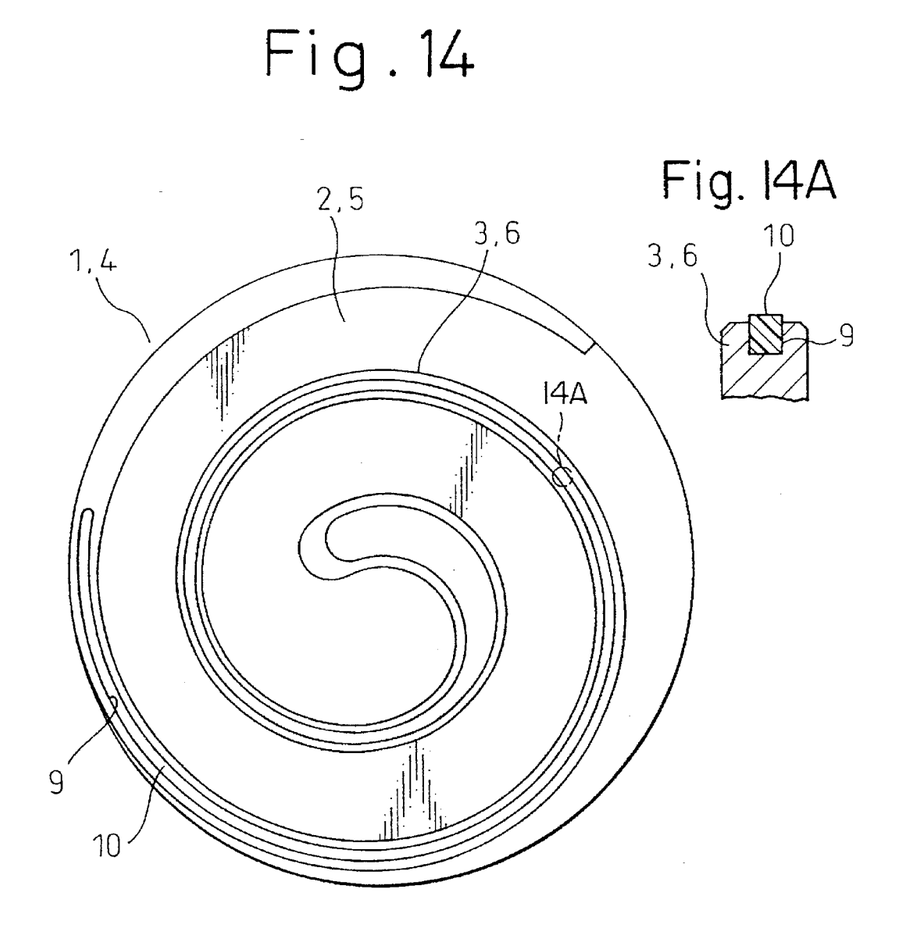
FIG. 14 is a front view of a scroll element, illustrating the shape of a curved groove formed in a spiral member of the scroll element and a mechanical seal snugly fitted in the curved groove.
FIG. 14A is a partial enlarged view of the area indicated in FIG. 14.

A conventional scroll member of a scroll-type fluid compressor has a general shape as shown in FIGS. 12 through 14. Namely, the scroll-type compressor has a stationary scroll member 1 fixedly attached to a housing (not shown) of the compressor, and a movable scroll member 4 movably engaged with the stationary scroll member 1. The stationary scroll member 1 includes a disk-like base plate 2 made of a metallic material such as aluminum, and a metallic spiral member 3 formed to be integral with the base plate 2. The movable scroll member 4 also includes a disk-like base plate 5 made of a metallic material such as aluminum, and a spiral member 6 formed to be integral with the base plate 5. When the stationary and movable scroll members 1 and 4 are assembled in the scroll-type compressor, the spiral members 3 and 6 are engaged to be angularly shifted by 180° from one another, and the side walls of the two spiral members 3 and 6 are kept in contact with each other at a plurality portions of the two members 3 and 6. Further, the axial ends of the respective spiral members 3 and 6, which extend spirally, are arranged to be close to an inner face of the engaged base plates 5 and 2 of the scroll members 4 and 1.

Thus, when the scroll-type compressor is in operation, and when the movable scroll member 4 orbits with respect to the stationary scroll member 1, compression chambers 7 formed by the engaged scroll members 1 and 4 gradually move from the outer portions of the spiral members 3 and 6 toward the central portion of the respective spiral members 3 and 6 so as to reduce the respective volumes of the compression chambers 7. Thus, in the respective compression chambers, a refrigerant gas for a refrigerating system is compressed, and is discharged as a compressed gas from the respective compression chambers 7 to the external refrigerating system through a central discharge port 8 of the compressor.

As best shown in FIG. 14, the respective spiral members 3 and 6 of the scroll elements 1 and 4 are provided with end faces in which a spirally extending groove 9 is formed to receive a mechanical seal 10 made of a synthetic resin material having high abrasion durability and high temperature-resistant property. The mechanical seal 10 of the respective spiral members 3 and 6 are constantly in tight contact with the inner faces of the engaged base plates 5 and 2 of the scroll members 4 and 1, so that the compression chambers 7 are fluidly isolated from one another by the mechanical seals 10 during the operation of the compressor.

In order to obtain the good sealing function of the mechanical seals 10 of the respective scroll elements 1 and 4, the dimensional accuracy of the mechanical seal 10 must be maintained during the manufacture thereof. Further, the dimension of the groove 9, especially, that of the width of the groove 9 of the respective scroll members 1 and 4 must be very accurate so as to snugly receive the mechanical seal 10 without any play between the side walls of the groove 9 and the mechanical seal 10.

Figure 2:
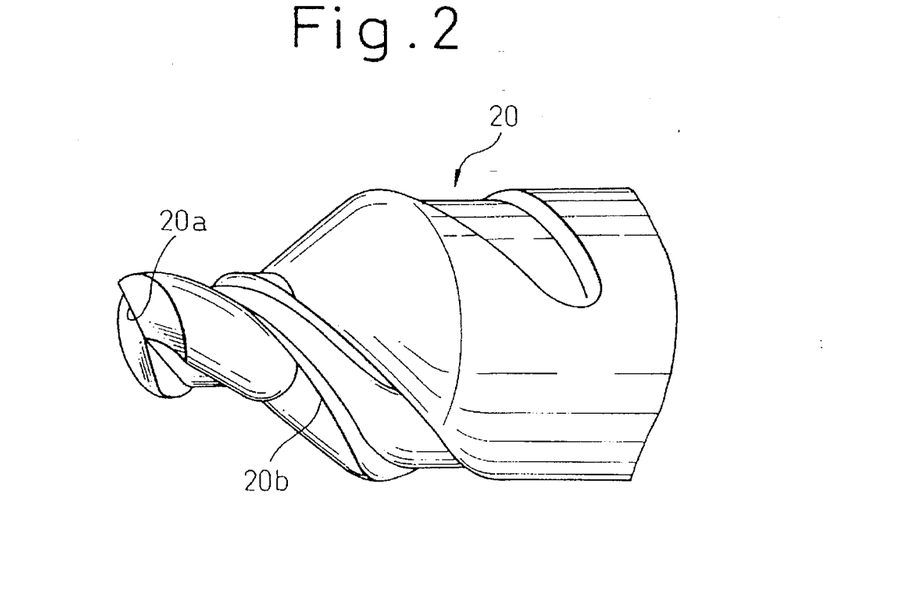
FIG. 2 is a perspective view of a milling cutter used for embodying the present invention.

The groove 9 of the respective scroll elements 1 and 4 extends so as to conform to the shape of the curve of the spiral members 3 and 6, i.e., the shape of an involute curve, and therefore, the production of the groove 9 is ordinarily achieved by the method of cutting by using a milling cutter, typically an end mill 20, as shown in FIG. 2.

Figure 5A:
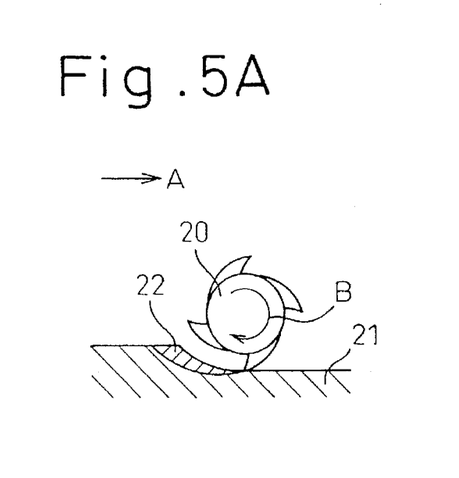
FIGS. 5A and 5B are schematic views of a workpiece and a milling cutter, illustrating two different milling conditions of the milling cutter.
Figure 5B:
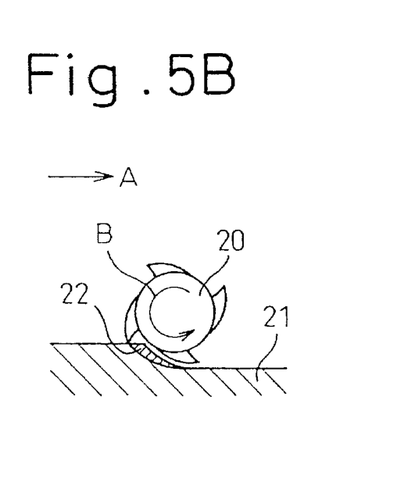

Nevertheless, when the groove 9 of the respective spiral members 3 and 6 of the scroll elements 1 and 4 is cut by the end mill 20, a problem as described hereinafter occurs. Namely, when the cutting of the groove 9 from an end thereof to the other end thereof is continuously processed by only one way movement of the end mill 20 along the involute curve, the end mill 20 cuts one of the side walls of the groove 9 in up milling in which a workpiece 21 (the scroll element 1 or 4) is relatively fed in a direction "A" and the end mill 20 is rotated in a direction "B" against the direction "A" as shown in FIG. 5A, and the end mill 20 cuts the other side wall of the groove 9 in down milling in which the workpiece 21 (the scroll element 1 or 4) is relatively fed in a direction "A" and the end mill 20 is rotated in a direction "B" corresponding to the direction "A" as shown in FIG. 5B. In FIGS. 5A and 5B, the reference numeral 22 designates the shape of a chip produced during the cutting operation of the end mill 20.

When up milling is compared with down milling, it can be seen that in the up milling process, the entrance of the cutting edge of the end mill 20 into the workpiece 21 gradually increases from a minimum to a maximum, as shown in FIG. 5A, and therefore, when the rotation of the end mill 20 and the relative workpiece feed are at high speed, the cutting edges of the end mill 20 often fails to enter the workpiece 21 by slipping thereof on the surface of the workpiece 21, resulting in a formation of a coarse or ridged surface on the side wall of the groove 9.

Further, for example, when the workpiece 21 is a soft aluminum workpiece, the workpiece 21 is easily elastically deformed during the cutting operation of the end mill 20. Thus, the elastic deformation of the workpiece 21 makes it more difficult for the cutting edges of the end mill 20 to enter the workpiece 21.

On the other hand, in the down milling process of the other side wall of the groove 9, the initial entrance of the cutting edge of the end mill 20 into the workpiece 21, i.e., the side wall of the groove 9 is surely accomplished so that removal of the workpiece 21 decreases from a maximum to a minimum, as shown in FIG. 5B. Namely, the cutting of the workpiece 21 is smoothly processed without the formation of any appreciable coarse or rough surface on the side wall of the groove 9. The formation of the rough or coarse surface on one of the side walls of the groove 9 of the respective spiral members 3 and 6 degrades the surface finish of the side walls of the groove 9 while bringing about an reduction in the dimensional accuracy of the width of the groove 9. Accordingly, the mechanical seal 10 cannot be snugly fitted in the groove 9.

Taking into account the above-mentioned situation in the formation of the groove 9 by using the milling cutter, it will be easily understood that the cutting of both side walls of the groove 9 of the respective spiral members 3 and 6 of the scroll elements 1 and 4 should be processed in the down milling by relatively feeding the milling cutter (the end mill 20) in both ways (in the directions "A" and "B") along the predetermined curve, e.g., the involute curve. Nevertheless, the feeding of the milling cutter with respect to the workpiece 21 in both ways (forward and return feeding) causes an increase in the cutting time of the groove 9.

Further, if the production of the groove 9 is carried out by providing a relative feed between the milling cutter, i.e., the end mill 20 and the workpiece 21 at a reduced speed in only one way, in order to reduce the formation of the coarse and rough surface on the side walls of the groove 9 of the spiral members 3 and 6, the cutting time of the groove 9 increases bringing about a reduction in the production rate of the scroll elements 1 and 4.

SUMMARY OF THE INVENTION

Accordingly, an object of the present invention is to provide a method of producing a curved groove of a workpiece in a reasonable cutting time and without formation of a coarse and rough surface on the side walls of the curved groove which might be caused by up milling of the work.

Figure 6:
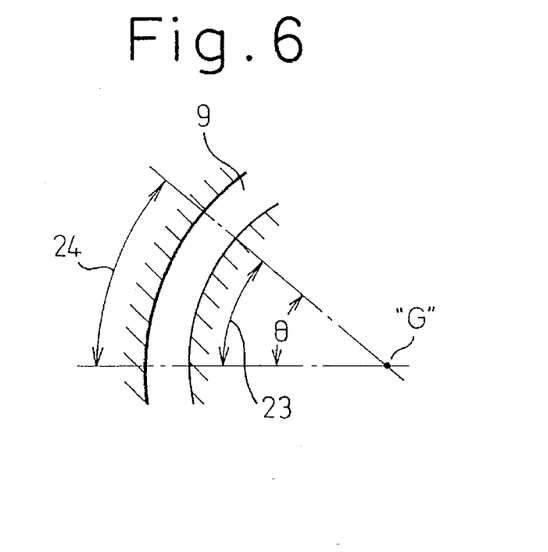
FIG. 6 is a schematic explanatory view, illustrating a difference in cutting amount between inner and outer side walls of a curved groove receiving a mechanical seal.

Taking the above object of the present invention into consideration, the present inventors have conducted a precise search for the cause of the formation of coarse and rough surface in a work, i.e., in the spiral member of a scroll element, due to the up milling machining process. Consequently, it was found that when a curved groove 9 is produced by moving a rotating milling cutter against the relative feed between the workpiece and the milling cutter, there is a large difference between formation of the coarse and rough surface on the outer side wall and that on the inner side wall with respect to the center of curvature of the curved groove 9. Namely, as shown in FIG. 6, since the groove 9 has the shape of an involute curve, during the process of an up milling of a groove portion 9 extending through an angle "φ" with respect to a predetermined center of curvature "C" by the milling cutter 20, an amount of cut 24 along the outer side wall of the portion of the groove 9 is necessarily larger than that 23 along the inner side wall. Thus, a large slipping of the cutting edge of the milling cutter 20 carrying out the up milling is apt to occur on the outer side wall of the groove portion 9 compared with the inner side wall. Additionally, an arc of contact of the milling cutter 20 with the outer side wall of the groove portion 9 is larger than that with the inner side wall of the same groove portion 9, and accordingly, the milling cutter 20 is subjected to a larger contact resistance from the outer side wall of the groove portion 9. Further, the length of arc on the outer side wall of the groove portion 9 is larger than that on the inner side wall, and therefore, the mechanical rigidity of the outer side wall of the groove portion 9 is less than that of the inner side wall of the groove portion 9. Accordingly, during the up milling of the groove portion 9, the elastic deformation of the outer side wall is larger than that of the inner side wall. The above-mentioned large slipping of the cutting edge of the milling cutter 20, the large contact resistance, and the large elastic deformation on the outer side wall of the groove portion 9 cause the formation of a coarse and rough surface on the outer side wall of the groove portion 9 in comparison with that on the inner side wall. That is, it was clarified that, during a continuous up milling process of the curved groove 9 of the work, i.e., the spiral member of the scroll element, by the milling cutter 20, typically an end mill, the formation of the coarse and rough surface can be very small on the inner side wall of the groove 9. Thus, the present inventors directed their attention to the clarified result of their research, and have made the present invention.

Figure 4:
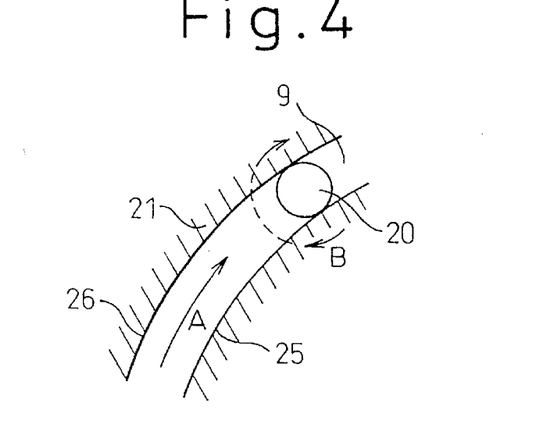
FIG. 4 is a partial enlarged view of FIG. 1.

In accordance with the present invention, there is provided a method of producing a curved groove in a workpiece to receive a mechanical seal element therein by using a milling cutter in which, as shown in FIG. 4, the milling cutter 20 is set so as to perform an up milling of an inner side wall 25 of the curved groove 9 with respect to a center of curvature, by rotating the milling cutter 20 in a direction "B" against a direction "A" of a relative feed between the milling cutter 20 and the workpiece 21, and the milling cutter 20 is further set so as to perform a down milling of an outer side wall 26 of the curved groove 9, the relative feed between the milling cutter and the workpiece being conducted to permit the milling cutter to produce the curved groove 9 from a first end thereof to the opposite second end thereof in a one way cutting manner in which the return of the rotating milling cutter from the second end to the first end is not conducted.

In accordance with the above-mentioned method of producing the groove in the workpiece of the present invention, since the inner side wall 25 of the curved groove 9 is subjected to the up milling of the milling cutter 20 during the production of the curved groove 9 by the milling cutter 20 fed one way relative to the workpiece 21, the slipping of the cutting edge of the milling cutter 20 on the surface of the inner side wall 25 can be reduced, and the milling cutter 20 is subjected to a small cutting resistance. Further, the inner side wall 25 of the curved groove 9 has a mechanical rigidity larger than that of the outer side wall 26 of the curved groove 9, and allows little elastic deformation thereof during the milling process. Thus, the formation of a coarse and rough surface on the inner side wall 25 of the curved groove 9 due to the up milling of the milling cutter 20 can be sufficiently reduced.

On the other hand, since the outer side wall 26 of the curved groove 9 of the workpiece 21 is subjected to the down milling of the milling cutter 20, the formation of a coarse and rough surface on the outer side wall 26 can be prevented in spite of the fact that the cutting amount of the outer side wall 26 is larger than that of the inner side wall 25, and that the mechanical rigidity of the outer side wall 26 is smaller than that of the inner side wall 25. Therefore, in the above-mentioned method of producing a curved groove in a workpiece according to the present invention, the width of the curved groove of the workpiece can be accurate enough for obtaining a required production quality.

Further, in the method of producing a curved groove in a workpiece to receive a mechanical seal element by using a milling cutter, a time required for completing the production of the curved groove can be reduced to a half of the time required for conducting the round-trip cutting to produce the groove at a high production quality. Accordingly, the manufacturing cost for producing a curved groove in a workpiece can be appreciably reduced. Further, when mass production of a product having a curved groove is requested, the size of the required production facility can be reduced to the smallest possible size to thereby permit the cost for the production facility to be sufficiently reduced.

Preferably, when a curved groove is produced in a workpiece by a milling cutter having cutting edges and an outer diameter thereof substantially corresponding to the width of the curved groove, the milling cutter is set so as to perform an up milling of an inner side wall of the curved groove with respect to a center of curvature thereof, by rotating the milling cutter in a direction "B" against a direction "A" of a relative feed between the milling cutter and the workpiece, and the milling cutter is further set so as to perform a down milling of an outer side wall of the curved groove, the relative feed between the milling cutter and the workpiece being conducted to permit the milling cutter to produce the curved groove 9 from a first end thereof to the opposite second end thereof in one way cutting manner in which a return of the rotating milling cutter from the second end to the first end is not conducted.

Preferably, when a curved groove is produced in a workpiece by a milling cutter having an outer diameter corresponding to the width of the curved groove, the milling cutter may be set so as to perform an up milling of an inner side wall of the curved groove with respect to a center of curvature, by rotating the milling cutter in a direction "B" against a direction "A" of a-relative feed between the milling cutter and the work, and is simultaneously set so as to perform a down milling of an outer side wall of the curved groove, the relative feed between the milling cutter and the workpiece being conducted to permit the milling cutter to simultaneously produce the inner and outer side walls 25 and 26 of the curved groove 9 from a first end of the curved groove to the opposite second end of the curved groove.

The above-mentioned methods using the milling cutter having the diameter corresponding to the width of the curved groove are able to achieve the same advantageous effects as those obtained by the first-mentioned method of the present invention.

The workpiece 21 may be positioned in such a manner that a face thereof in which the curved groove 9 is produced by the milling cutter rotating about a horizontal axis is arranged to lie in a vertical plane. In this case, a relative feed motion provided between the milling cutter 20 and the workpiece 21 is controlled in such a manner that the inner side wall 25 of the curved groove 9 subjecting to the up milling of the milling cutter is constantly positioned vertically above the outer side wall 26 of the curved groove 9. In this way, since the curved groove 9 is produced by the milling cutter under a condition such that the inner side wall 25 subjecting to the up milling of the milling cutter is above the outer side wall 26, chips do not remain on the inner side wall 25 during the production process of the curved groove 9. Thus, formation of a coarse and rough surface on the inner side wall 25 due to the presence of cutting chips can be successfully prevented to result in an improved finishing surface on the inner side wall in spite of the up milling of the milling cutter.

It should be understood that the above-described reference numerals indicate a correspondence between the above-mentioned inventions and the later-described embodiments of the present invention.

BRIEF DESCRIPTION OF THE DRAWINGS

The above and other objects, features, and advantages of the present invention will be made more apparent from the ensuing description of the preferred embodiments with reference to the accompanying drawings wherein.

DESCRIPTION OF THE PREFERRED EMBODIMENTS (The First Embodiment)

In a method of producing a curved groove in a workpiece to receive a mechanical seal according to the first embodiment, a curved groove 9 of each of the scroll elements 1 and 4 of the scroll type fluid compressor shown in FIGS. 12 through 14A is successfully produced.

Figure 1:
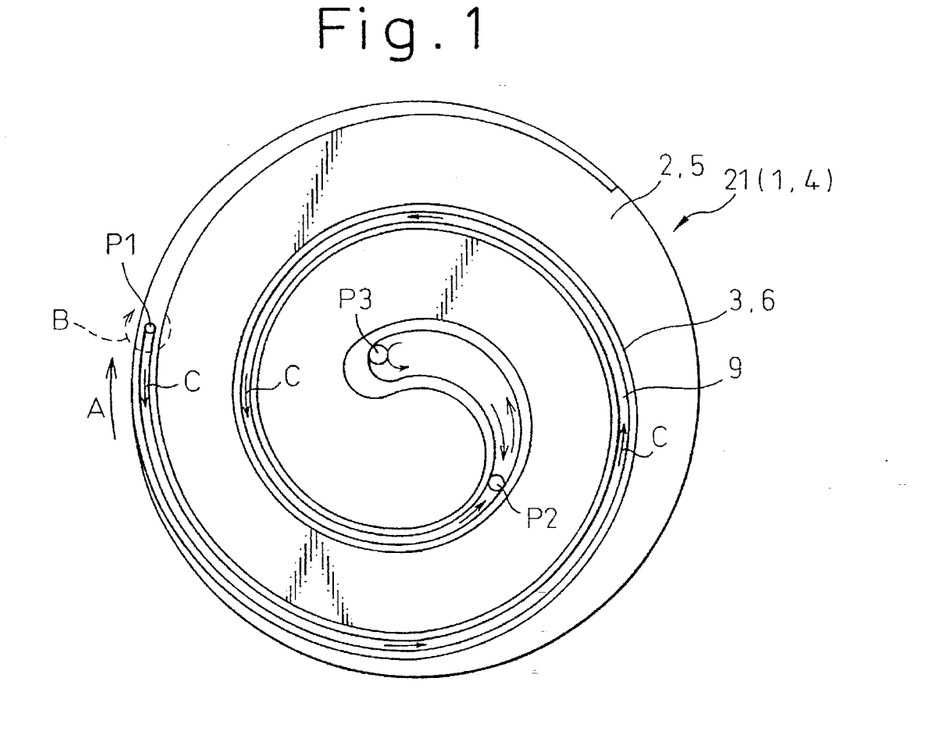
FIG. 1 is a front view of a work, illustrating a first embodiment of the present invention.

Referring to FIG. 1, a curved groove 9 receiving therein a mechanical seal 10 (see FIGS. 14A) is produced in a workpiece 21 (i.e., a spiral member 3 or 6 of a scroll element 1 or 4) from a point "P1" located at a given position in the outermost portion of the spiral member 3 or 6 toward the center of the spiral member 3 or 6 in a direction "C" by the one way cutting method in which a milling cutter (not shown in FIG. 1) is relatively moved in only one way from the point "P1" to the center of the spiral member 3 or 6 without a relative return of the milling cutter with respect to the workpiece 21. At this stage, in the first embodiment of the present invention, the curved groove 9 is designed so as to have a large width section in the central portion of the spiral member 3 or 6, i.e., a section extending from a point "P2" through a point "P3". Therefore, the large width section of the curved groove 9 extending between the points P2 and P3 must be produced by conducting a later-described relative round-trip cutting by the milling cutter.

The milling cutter used for producing the curved groove 9 of the workpiece 21 is shown in FIG. 2, which is conventionally referred to as an end mill having an end-cutting edge 20a formed in the frontmost end of a small-diameter portion and a spirally extending side-cutting edge 20b formed in an outer circumference of a large-diameter portion providing a relief for the removal of a chip. The side-cutting edge 20b of the end mill 20 of FIG. 2 is formed to extend circularly to the right, and has an outer diameter substantially corresponding to the width of the curved groove 9. Thus, the end mill 20 can simultaneously cut the outer and inner side walls of the curved groove 9.

Figure 3:
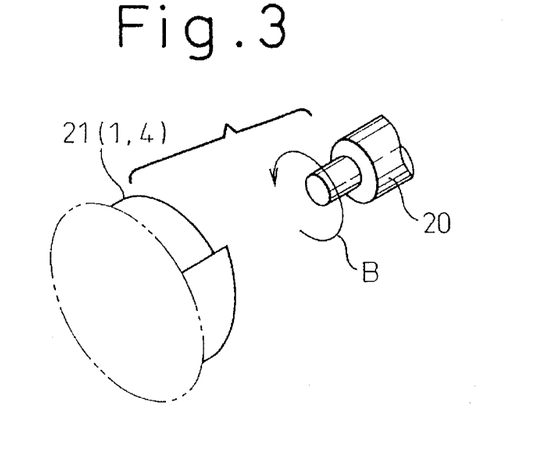
FIG. 3 is a schematic perspective view of a combination of a workpiece and a milling cutter used for embodying the present invention.

When the milling operation of the end mill 20, having the side-cutting edge 20b spiraling to the right, is conducted, the direction of rotation of the end mill 20 is set in a counter-clockwise direction designated by "B" in FIGS. 1 and 3.

Further, a relative movement (a relative feed) between the workpiece 21 (the scroll element 1 or 4) and the end mill 20 is set in a direction designated by "A" in FIG. 1. The relative movement in the direction "A" can be obtained by either moving the rotating end mill 20 in a direction "C" with respect to the workpiece 21 stationarily clamped at a given fixed position or moving the workpiece 21 in the direction "A" with respect to the end mill 20 set to be rotated at a given fixed position.

As required, the relative movement between the workpiece 21 and the rotating end mill 20 may be obtained by moving the workpiece 21 in the direction "A" and by simultaneously moving the end mill 20 in the direction "C".

Referring to FIG. 4, in order to implement the production of the curved groove 9 in the workpiece 21, the relative movement between the workpiece 21 and the end mill 20 is set to be in the direction "A", and the rotation of the end mill 20 is set in the direction "B". Since the groove 9 having the shape of an involute curve is provided with an inner side wall 25 and an outer side wall 26 with respect to the center of curvature of the involute curve, the inner side wall 25 can be subjected to an up milling in which the cutting edge 20b of the end mill 20 rotates against the direction "A" of the relative movement between the workpiece 21 and the end mill 20. Then, the outer side wall 26 of the curved groove 9 can be subjected to a down milling in which the cutting edge 20b of the end mill 20 rotates toward the direction "A" of the relative movement between the workpiece 21 and the end mill 20. Therefore, when the milling of the curved groove 9 in the workpiece 21 is processed by the rotating end mill 20 from the point "P1" toward the point "P2" (see FIG. 1) in the direction "C", the inner side wall of the groove 9 is subjected to the up milling as shown in FIG. 5A. However, as previously described, slipping of the cutting edge 20b of the end mill on the surface of the inner side wall 25 as well as cutting resistance from the inner side wall to the cutting edge of the end mill are appreciably small, and further, as the inner side wall 25 exhibits a high mechanical rigidity and a small elastic deformable property, formation of a coarse and rough surface on the inner side wall 25 can be sufficiently suppressed.

On the other hand, the outer side wall 25 of the curved groove 9 is constantly subjected to the down milling shown in FIG. 5B, and accordingly, formation of a coarse and rough surface on the outer side wall 26 can be prevented.

When the milling process reaches the point "P2" (FIG. 1) of the curved groove 9, the process is switched so that only the outer side wall 25 of the groove 9 is continuously subjected to the down milling of the end mill 20 until production of the curved groove 9 on the side of the outer side wall 25 reaches the point "P3". At the point "P3", the direction of the milling process is reversed, so that production of the curved groove 9 on the side of the inner side wall by the end mill 20 is carried out until the milling process reaches the point "P2". At this stage, it should be noted that since the direction of the relative movement between the workpiece 21 and the end mill 20 is changed to a direction reverse to the direction "A" from the point "P3", the inner side wall 25 can be subjected to the down milling of the end mill 20 rotating in the direction "B". Thus, formation of the coarse and rough surface on the inner side wall 25 extending between the points "P3" and "P2" can be surely prevented. When the milling process cutting the inner side wall 25 by the down milling reaches the point "P2", the production of the curved groove 9 including the production of the large width section close to the central portion of the spiral member 3 or 6 is entirely completed. It will be understood that the production of the large width section of the curved groove 9 is achieved by the round-trip movement of the end mill 20 relative to the workpiece 21.

The cutting conditions employed for achieving the method of the first embodiment are set forth below.

The rotating speed of the milling cutter (the end mill) 20: 30,000 through 40,000 R.P.M Feed speed for the milling process: 7,000 through 8,000 mm/min The width of the curved groove: 2 mm The depth of the curved groove 9: 1.5 mm The material of the workpiece 21: high silicon aluminum When the curved groove 9 is produced by the method of the first embodiment under the cutting conditions as set froth above, it was possible to obtain the curved groove 9 having a width the dimension of which is within an allowance of ±0.01 mm for the designed dimension of 2.00 mm.

(The Second Embodiment)

Figure 7:
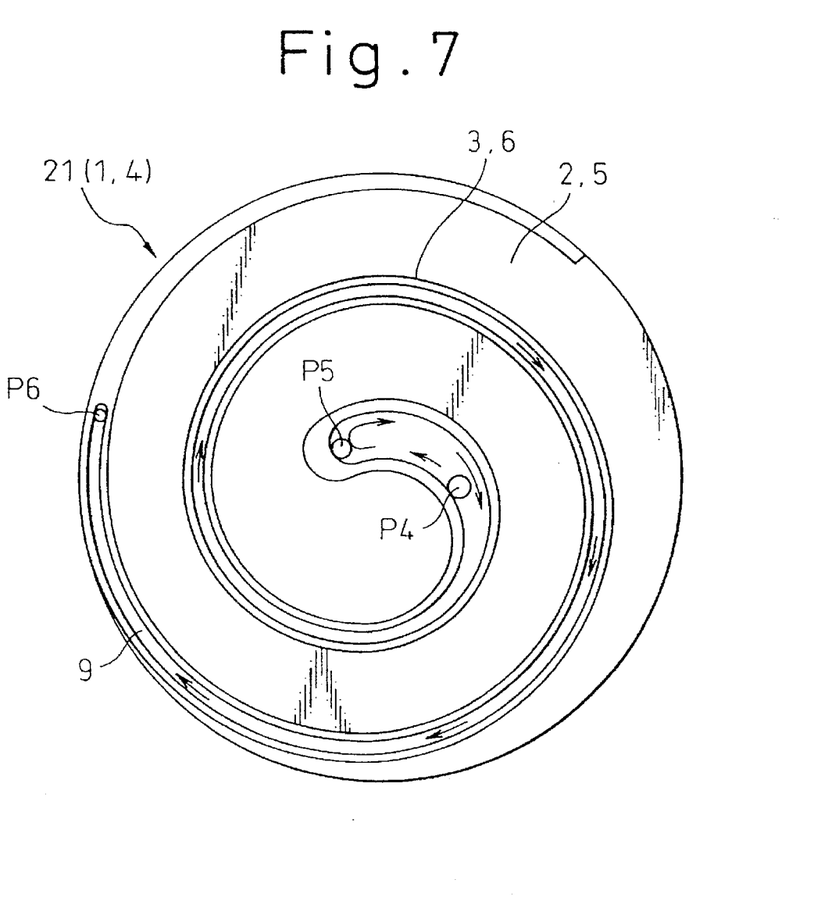
FIG. 7 is a front view of a work, illustrating a second embodiment of the present invention.

Referring to FIG. 7, and contrary to the first embodiment, a curved groove 9 is initially produced in the central portion of a spiral member 3 or 6 of the workpiece 21 (1, 4) by the round-trip milling of the milling cutter 20 with respect to the workpiece 21, and then, the curved groove 9 is gradually produced from the central portion toward the outer circumferential section of the spiral member 3 or 6 by the one-way milling method.

More specifically, the curved groove 9 is initially produced between the point "P4" and "P5" of FIG. 7 on the side of the inner side wall by the down milling of the milling cutter, i.e., the end mill 20, and thereafter, the groove 9 is produced between the point "P5" and "P4" on the side of the outer side wall by the down milling of the milling cutter. Then, the remaining curved groove 9 from the point "P4" to the point "P5" is produced in a manner such that the inner side wall is subjected to the up milling cutting, and the outer side wall is simultaneously subjected to the down milling of the milling cutter 20. Namely, the curved groove 9 extending between the point "P4" and the point "P5" is produced by the one-way milling method.

In the above-described first and second embodiments of the present invention, the central section of the curved groove 9 is formed to have a large width. However, the method of producing the curved groove 9 according to the present invention can be equally applicable to a case where the entire section of the curved groove 9 has an equal width. In that case, the curved groove 9 can be produced by only the one-way milling method.

(The Third Embodiment)

The method of producing a curved groove in a workpiece according to the third embodiment is improved over the afore-described second and third embodiments.

In the first and second embodiments, the inner side wall 25 of the curved groove 9 is subjected to an up milling of the milling cutter 20 rotating in the direction "B" against the direction "A" of the relative movement between the workpiece 21 and the milling cutter 20 so that formation of a coarse and rough surface on the inner side wall of the groove 9 is suppressed. Nevertheless, the present inventors found that when only the inner side wall 25 is processed by the up milling method, a coarse and rough surface might be formed on the inner side wall during a course of the milling process, in which the inner side wall 25 is directed vertically downward. Thus, accurate production of the curved groove 9 having a width with an accurate dimension cannot be stably obtained.

A reason why the coarse and rough surface is formed during the up milling process of the inner side wall 25 of the curved groove 9 of the workpiece 21 while the inner side wall 25 is directed vertically downward will be described hereinbelow.

Figure 8:
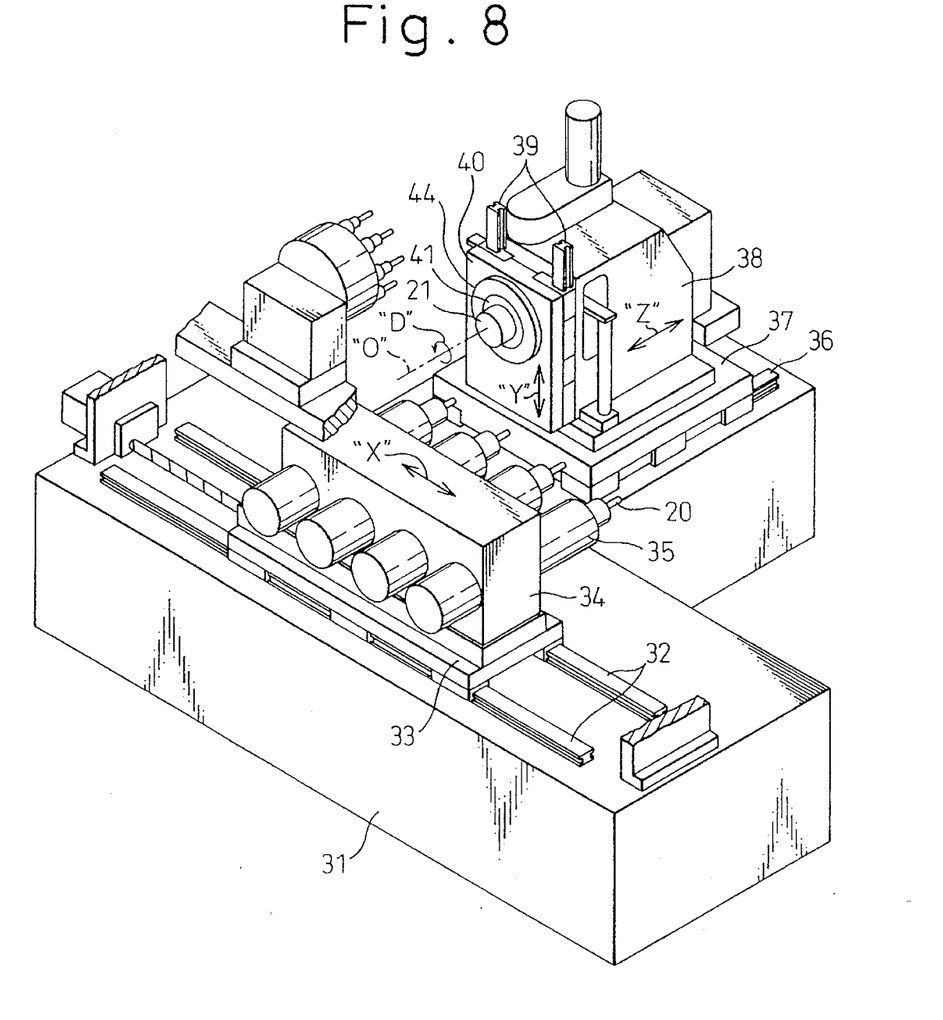
FIG. 8 is a perspective view of a lateral type scroll production machine, used or embodying a third embodiment of the present invention.

Initially, a description of a lateral type scroll producing machine employed for conducting the method of producing a curved groove in a work, according to the present invention, will be provided with reference to FIG. 8.

The lateral type scroll producing machine is provided with a machine bed 31 on which a pair of parallel X-axis slides 32, 32 are fixedly arranged so as to slidably support a X-axis table 33. Namely, the X-axis table 33 can slide in X-axis direction in a reciprocatory manner. On the X-axis support table 33 is fixedly mounted a movable support body 34 provided with a plurality (four in the shown example) of spindle units 35 held horizontally. The respective spindle units 35 have the afore-mentioned end mill 20 in a position in which the end mill is rotated about a horizontal axis for producing the curved groove 9 by milling.

On the machine bed 31, are mounted a pair (only one is shown in FIG. 8) of parallel Z-axis slides 36 which are arranged to be perpendicular to the X-axis slide 32. The Z-axis slides 36 support thereon a Z-axis table 37, respectively, which is slidable in opposite directions in Z-axis as shown in FIG. 8. On the upper surface of the Z-axis tables 37, is fixedly mounted a column 38 having a front vertical face on which a pair of parallel Y-axis slides 39 are vertically supported.

The pair of Y-axis slides 39 support a Y-axis table 40 so as to be slidable in the direction of Y-axis (in the vertical direction of FIG. 8). The Y-axis table 40 is provided with a work chuck 41 chucking a workpiece 21 (i.e., a scroll element 1 or 4), and the work chuck 41 is rotatably supported by a turntable 44. The axis of each of the spindle units 35 is parallel with the axis "0" of the work chuck 41 which corresponds to the axis of the work 21. The turntable 44 can be rotated in the opposite directions shown by an arrow "D" about the axis "0" of the work chuck 41.

The reciprocatory movement of the milling cutter 20 via the spindle unit 35 in the X-axis direction, the movements of the work chuck 41 in opposite directions of Y-Axis and in opposite directions of Z-axis, the rotation of the work chuck 41 in the opposite directions shown by "D" are controlled by controlling the respective drive mechanisms of these movable elements and units by a known numeric control method. Naturally, the numeric control of the respective drive mechanisms are conducted by a numerical control program preliminarily stored in a control unit (not shown in FIG. 8) of the lateral type scroll producing machine.

As shown in FIG. 8, the lateral scroll producing machine has horizontal spindle units 35 to which each of the milling cutters 20 is attached in a posture thereof in which an axis of each milling cutter 20 is maintained horizontal. Thus, the workpiece 21 is mounted on the workp chuck 41 in such a manner that a face of the workpiece 21 in which the afore-described curved groove 9 is produced is arranged to lie in a vertical plane. Since the milling cutter 20 held by the spindle unit 35 horizontally enters the workpiece 21, cutting chips are easily removed from the cutting portion of the workpiece 21.

Figure 9A:
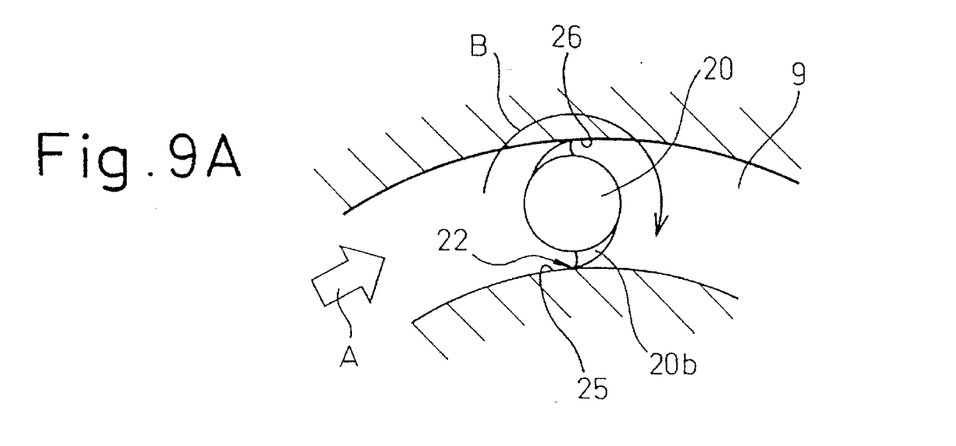
FIGS. 9A and 9B are schematic explanatory views, illustrating a difference in a milling method between a first method in which the inner side wall subjecting to an up milling of the milling cutter is arranged vertically below the outer side wall of the curved groove, and a second method in which the inner side wall subjecting to an up milling of the milling cutter is arranged vertically above the outer side wall of the curved groove.

Further, according to an experimental milling of the workpiece 21 conducted by the present inventors, coolant (cooling water) is supplied to the cutting portion of the workpiece 21, in order to promote the removal of cutting chips from the curved groove 9 of the workpiece 21. It was, however, found that in spite of supply of the coolant, cutting chips could not be completely removed from the groove 9, and a given amount of chips was deposited on a surface portion of the inner or outer side wall which is directed to vertically downward during the milling process of the milling cutter 20. As a result, as shown in FIG. 9A, when the inner side wall 25 of the curved groove 9 which is subjected to the up milling takes a position where the inner side wall 25 is directed to the vertically downward and located beneath the outer side wall 26, cutting chips 22 depositing on the inner side wall 25 interfere with the cutting edges 20b of the rotating end mill 20 to cause formation of a coarse and rough surface on the inner side wall 25 of the curved groove 9.

Figure 9B:
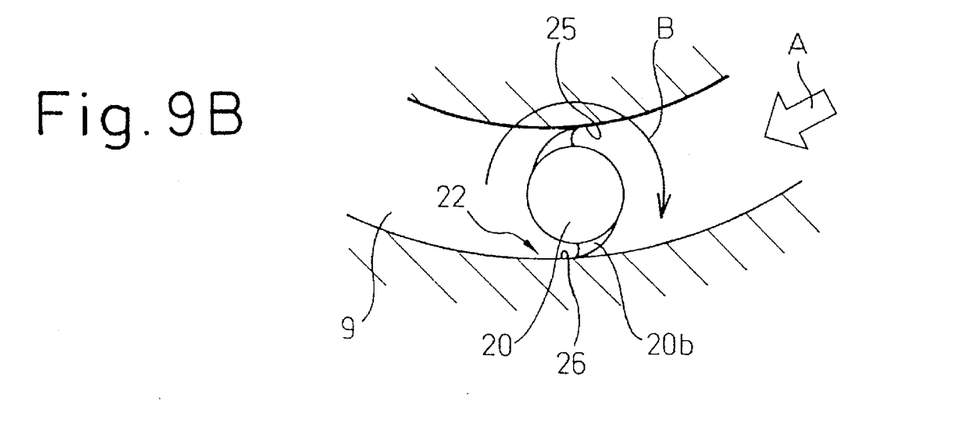

In the method according to the third embodiment of the present invention, the relationship between the rotating milling cutter (the end mill) 20 and the workpiece 21 are set so that the inner side wall 25 of the curved groove 9 subjected to the up milling of the milling cutter 20 is constantly directed vertically upward and positioned above the outer side wall 26 of the groove 9, as shown in FIG. 9B. Thus, no cutting chips are left on the inner side wall 25 during the up milling by the milling cutter 20, and accordingly, interference between the cutting edges 20b of the milling cutter 20 and the cutting chips 22 does not occur, and formation of a coarse and rough surface on the inner side wall 25 can be surely prevented.

Figures 10, 10A, 10B, 10C, 10D:
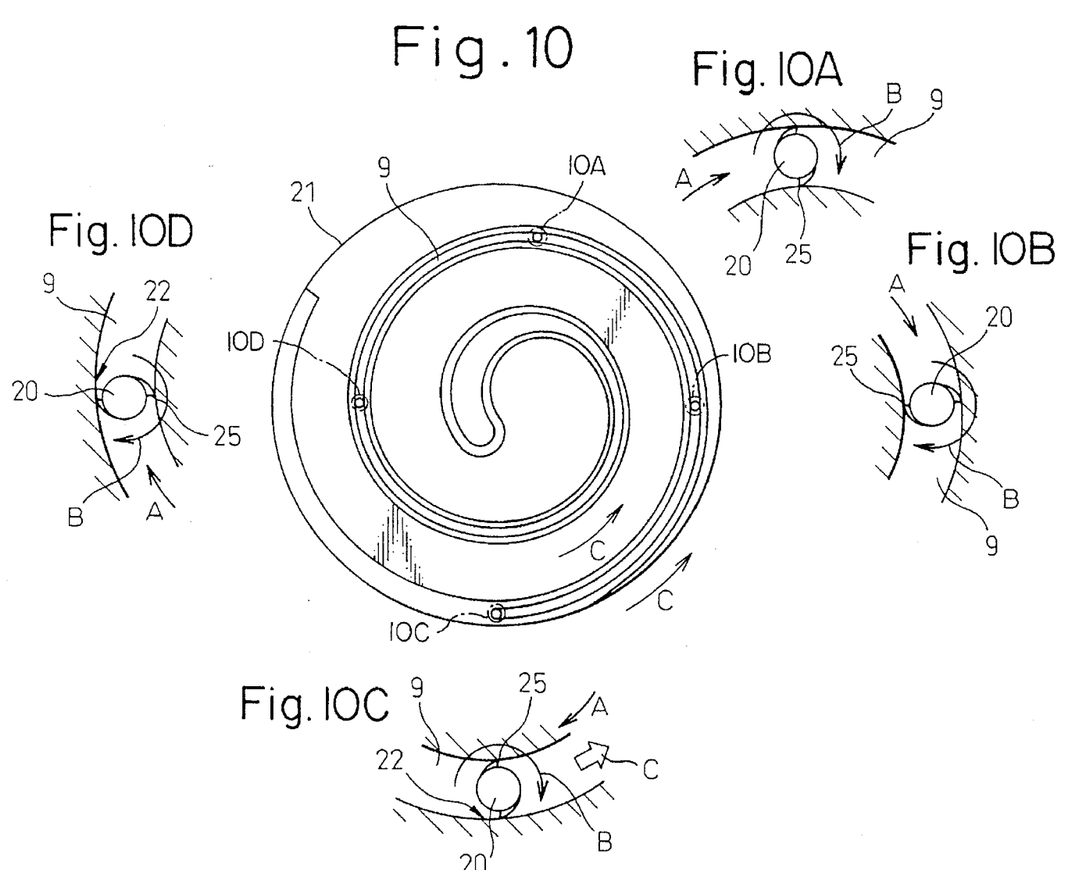
FIG. 10 is an explanatory view of a workpiece, illustrating different conditions of the inner side wall of the curved groove in response to the advance of a milling process for producing a curved groove in the workpiece to receive a mechanical seal.
FIGS. 10A, 10B, 10C, and 10D are partial enlarged views of the areas indicated in FIG. 10.

At this stage, before providing a detailed description of the third embodiment, the method of producing a curved groove 9 according to the first and second embodiments, in which the inner side wall 25 of the curved groove 9 is constantly set to be directed vertically downward with reference to FIG. 10.

In the method of producing a curved groove 9 as shown in FIGS. 10A–10D, the movement of the milling cutter 20 in X-axis direction and Y-axis direction with respect to the workpiece 21 is numerically controlled so as to produce an involute groove 9 in the workpiece 21. In FIG. 10, an arrow "C" indicates a direction of movement of the milling cutter 20, and an arrow "A" indicates a direction of the relative feed between the milling cutter 20 and the workpiece 21.

As is apparent from the illustration of FIGS. 10A–10D, the direction of the inner side wall 25 of the involute groove 9 subjected to the up milling is gradually changed while the production of the involute curve 9 is advanced. In FIG. 10, a relationship between the groove 9 and the milling cutter 20 is shown in an enlarged scale with respect to the effect of the four positions of the involute groove 9 on the way of producing the involute groove 9. For example, the inner side wall 25 of the involute groove 9 is directed vertically downward in FIG. 10A. Thus, the afore-mentioned problem of interference of the chips with the cutting edged 20b of the milling cutter 20 occurs.

Figure 11A:
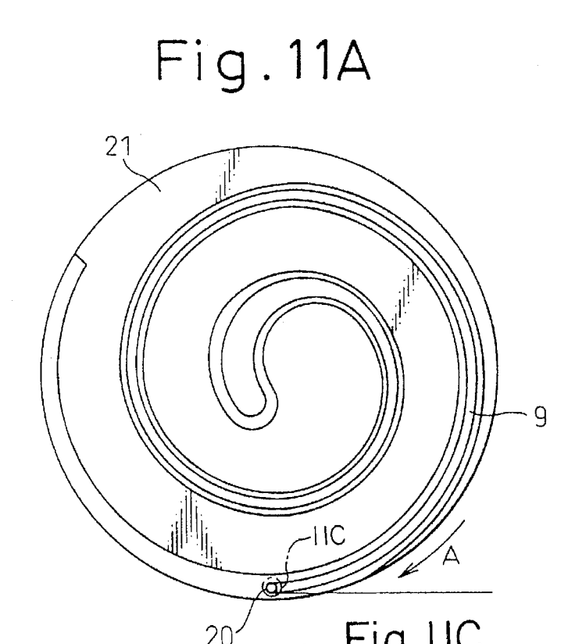
FIGS. 11A and 11B are front views of a workpiece, illustrating a method of producing a curved groove in the workpiece, according to the third embodiment of the present invention.
Figures 11B, 11D:
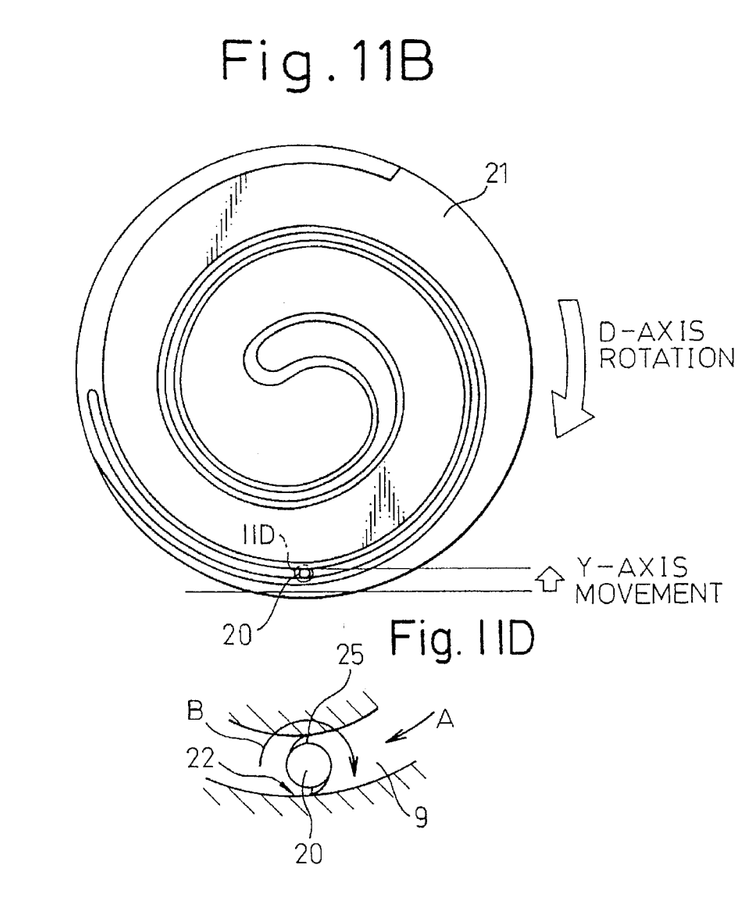
FIGS. 11C and 11D are partial enlarged views of the areas indicated in FIGS. 11A and 11B, respectively.
Figure 11C:
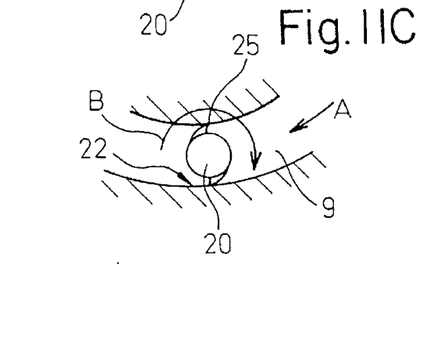

Nevertheless, when the method of the third embodiment of the present invention is employed, the movement of the workpiece 21 in the Y-axis direction (in the vertical direction) and the rotation of the workpiece in a direction "B" are cooperatively numerically controlled so that the milling cutter 20 implements a milling operation to produce a groove 9 having the shape of an involute curve. Further, the relationship between the workpiece 21 and the milling cutter 20 is controlled so that the inner side wall 25 of the involute groove 9 is constantly positioned vertically above the confronting outer side wall of the groove. Namely, since the vertically upward movement of the workpiece 21 in the Y-axis direction is numerically controlled so as to be in association with the rotation of the workpiece 21 in the direction of the arrow "B", when the production process of the involute groove 9 is changed from a condition shown in FIGS. 11A and 11C to a different condition shown in FIGS. 11B and 11D, the inner side wall 25 of the involute groove 9 subjected to the up milling operation of the milling cutter 20 is constantly positioned vertically above the confronting outer side wall of the groove 9, as shown in FIGS. 11C and 11D in an enlarged scale. Thus, it is guaranteed that deposition of cutting chips on the surface of the inner side wall 25 can be prevented. Accordingly, formation of a coarse and rough surface on the inner side wall 25 of the groove 9 due to the interference of the chips with the milling cutter 20 is avoided.

Figure 15:
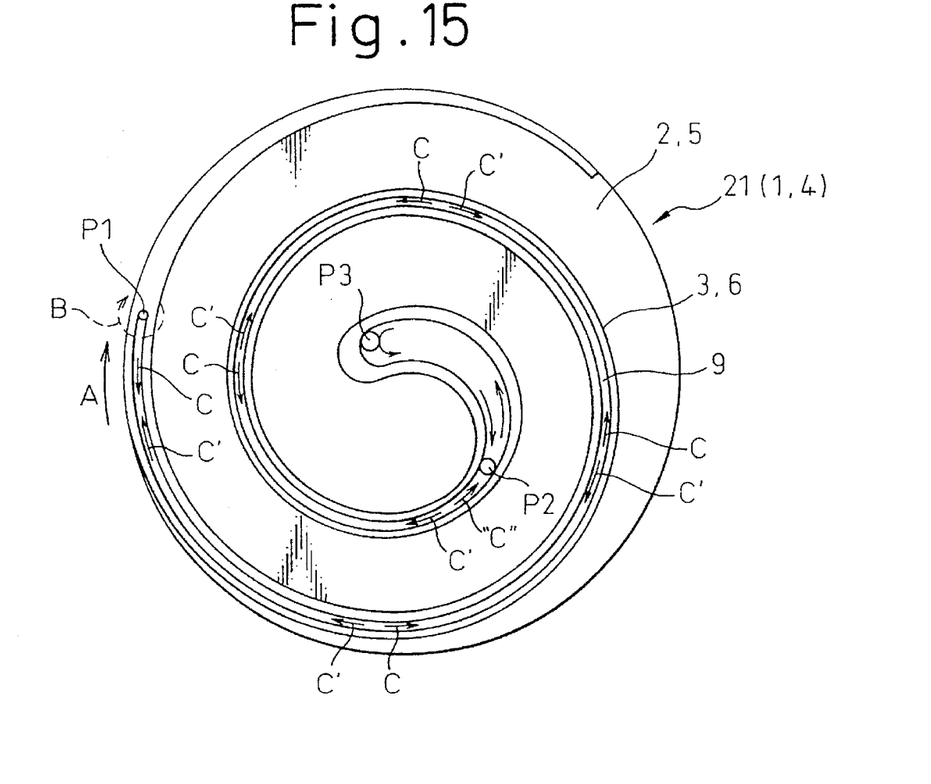
FIG. 15 is a front view of a workpiece, illustrating an example of a variation of the first embodiment of FIG. 1.

Alternatively, some variations may be made to the described first through third embodiments of the present invention. For example, the first embodiment may be varied as shown in FIG. 15. In FIG. 15, when the curved groove 9 is produced by the movement of the milling cutter 20 (see FIG. 2) in the direction of an arrow "C" from a point "P1" to a point "P3" in association of the relative feed "A" between the workpiece 21 and the milling cutter 20, it may be possible to provide the milling cutter 20 with a return movement shown by an arrow "C'" from the point P3 to the point P1 at a speed sufficiently higher than the speed of the first movement from the point P1 to P3. Thus, the outer and inner side walls of the curved groove 9 can be smooth. Accordingly, a mechanical seal 10 can be smoothly fitted in the curved groove 9.

Figure 16:
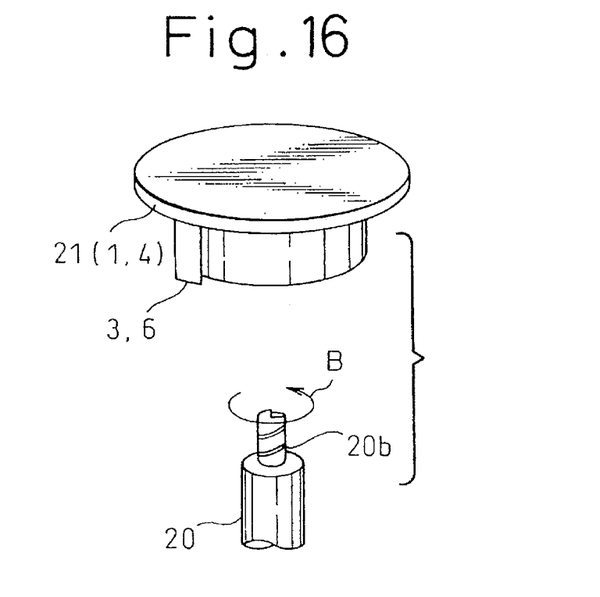
FIG. 16 is a schematic perspective view of a combination of a workpiece and a milling cutter, illustrating a further variation of the present invention.

Further, in the described embodiments, the face of the workpiece 21 in which the curved groove 9 is produced is maintained to lie in a vertical plane, so that the workpiece 21 is subjected to the milling operation of the milling cutter held in a position in which the axis of rotation of the milling cutter is horizontal. Nevertheless, as shown schematically shown in FIG. 16, the face of the workpiece 21 may be positioned so as to be directed vertically downward, and the milling cutter 20 is directed vertically upward. Then, the curved groove 9 can be produced in the workpiece by the same cutting principle as that employed by the afore-mentioned method of the first embodiment of the present invention.

Further variations and modifications will occur to a person skilled in the art without departing from the scope and spirit of the present invention as claimed in the accompanying claims.

What we claim:

1. A method of producing a curved groove, in a workpiece, to receive a mechanical seal element therein by using a milling cutter comprising the steps of:

setting said milling cutter so as to perform an up milling of an inner side wall of said curved groove with respect to a center of curvature of said groove;

rotating said milling cutter in a direction against a direction of a relative feed between said milling cutter and said workpiece;

setting said milling cutter to perform a down milling of an outer side wall of said curved groove confronting said inner side wall; and providing a relative feed between said milling cutter and said workpiece to permit said milling cutter to produce said curved groove from a first end thereof to an opposite second end thereof in a one way cutting manner in which said rotating milling cutter does not return from said second end to said first end.

2. The method according to claim 1, wherein said workpiece comprises a scroll element provided with a base plate and a spiral member attached to one of the opposite faces of the base plate, and wherein said curved groove is produced in an end face of said spiral member.

3. The method according to claim 2, wherein said curved groove has a width thereof which becomes large at a spirally central portion of said spiral member of said scroll element, and wherein said milling cutter is moved to perform a milling operation in a round-trip manner in said spirally central portion of said spiral member to thereby provide both said outer and inner side walls of said curved groove with a down milling operation.

4. The method according to claim 1, wherein said workpiece is set so that a face thereof in which said curved groove is produced lies in a vertical plane, wherein said milling cutter is set to be rotated about a horizontal axis during the production of said curved groove, and wherein the relative feed between said milling cutter and said workpiece is controlled so that said inner side wall of said curved groove is constantly vertically positioned above said inner side wall of said curved groove.

5. The method according to claim 4, wherein said relative feed between said milling cutter and said workpiece is controlled by controlling movements supplied to said workpiece in a vertical direction and a rotational direction.

6. The method according to claim 1, wherein said workpiece is set so that a face thereof in which said curved groove is produced lies in a horizontal plane and is directed vertically downward, and wherein said milling cutter is set to be rotated about a vertical axis during the production of said curved groove.

7. A method of producing a curved groove in a workpiece to receive a mechanical seal element therein by using a milling cutter having cutting edges of which the diameter is substantially the same as a width of the curved groove, comprising the steps of:

setting said milling cutter so as to perform an up milling of an inner side wall of said curved groove with respect to a center of curvature of said groove;

rotating said milling cutter in a direction against a direction of a relative feed between said milling cutter and said workpiece;

setting said milling cutter to perform a down milling of an outer side wall of said curved groove confronting said inner side wall; and providing a relative feed between said milling cutter and said workpiece to permit said milling cutter to produce said curved groove from a first end thereof to an opposite second end thereof in a one way cutting manner in which said rotating milling cutter does not return from said second end to said first end.

8. The method according to claim 7, wherein said workpiece comprises a scroll element provided with a base plate and a spiral member attached to one of opposite faces of the base plate, and wherein said curved groove is produced in an end face of said spiral member.

9. The method according to claim 8, wherein said curved groove has a width thereof which becomes large at a spirally central portion of said spiral member of said scroll element, and wherein said milling cutter is moved to perform a milling operation in a round-trip manner in said spirally central portion of said spiral member to thereby provide both said outer and inner side walls of said curved groove with a down milling operation.

10. The method according to claim 7, wherein said workpiece comprises a scroll-element provided with a base plate and a spiral member attached to one of opposite faces of the base plate, and wherein said curved groove is produced in an end face of said spiral member.

11. The method according to claim 10, wherein said curved groove has a width thereof which becomes large at a spirally central portion of said spiral member of said scroll element, and wherein said milling cutter is moved to perform a milling operation in a round-trip manner in said spirally central portion of said spiral member to thereby provide both said outer and inner side walls of said curved groove with a down milling operation.

12. The method according to claim 7, wherein said workpiece is set so that a face thereof in which said curved groove is produced lies in a vertical plane, wherein said milling cutter is set to be rotated about a horizontal axis during the production of said curved groove, and wherein the relative feed between said milling cutter and said workpiece is controlled so that said inner side wall of said curved groove is constantly vertically positioned above said inner side wall of said curved groove.

13. The method according to claim 12, wherein said relative feed between said milling cutter and said workpiece is controlled by controlling the movements of said workpiece in a vertical direction and a rotational direction.

14. The method according to claim 7, wherein said workpiece is set so that a face thereof, in which said curved groove is produced, lies in a horizontal plane and is directed vertically downward, and wherein said milling cutter is set to be rotated about a vertical axis during the production of said curved groove.

15. A method of producing a curved groove in a workpiece, to receive a mechanical seal element therein, by using a milling cutter having cutting edges of which the diameter is substantially the same as a width of the curved groove, comprising the steps of:

setting said milling cutter so as to perform an up milling of an inner side wall of said curved groove with respect to a center of curvature of said groove;

rotating said milling cutter in a direction against a direction of a relative feed between said milling cutter and said workpiece;

setting said milling cutter to perform a down milling of an outer side wall of said curved groove confronting said inner side wall; and providing a relative feed between said milling cutter and said workpiece to permit said milling cutter to produce said curved groove from a first end thereof to an opposite second end thereof while simultaneously milling said outer and inner side walls.

16. The method according to claim 15, wherein said workpiece comprises a scroll element provided with a base plate and a spiral member attached to one of the opposite faces of the base plate, and wherein said curved groove is produced in an end face of said spiral member.

17. The method according to claim 16, wherein said curved groove has a width thereof which becomes large at a spirally central portion of said spiral member of said scroll element, and wherein said milling cutter is moved to perform a milling operation in a round-trip manner in said spirally central portion of said spiral member to thereby provide both said outer and inner side walls of said curved groove with a down milling operation.

18. The method according to claim 15, wherein said workpiece comprises a scroll element provided with a base plate and a spiral member attached to one of opposite faces of the base plate, and wherein said curved groove is produced in an end face of said spiral member.

19. The method according to claim 15, wherein said workpiece is set so that a face thereof in which said curved groove is produced lies in a vertical plane, wherein said milling cutter is set to be rotated about a horizontal axis during the production of said curved groove, and wherein the relative feed between said milling cutter and said workpiece is controlled so that said inner side wall of said curved groove is constantly vertically positioned above said inner side wall of said curved groove.

20. The method according to claim 15, wherein said workpiece is set so that a face thereof in which said curved groove is produce lies in a horizontal plane and is directed vertically downward, and wherein said milling cutter is set to be rotated about a vertical axis during the production of said curved groove.

21. The method according to claim 15, wherein said workpiece comprises a scroll element provided with a base plate and a spiral member attached to one of the opposite faces of the base plate, and wherein said curved groove is produced in an end face of said spiral member.

22. The method according to claim 21, wherein said curved groove has a width thereof which becomes large at a spirally central portion of said spiral member of said scroll element, and wherein said milling cutter is moved to perform a milling operation in a round-trip manner in said spirally central portion of said spiral member to thereby provide both said outer and inner side walls of said curved groove with a down milling operation.

23. A method of producing a curved groove in a workpiece, to receive a mechanical seal element therein, by using a milling cutter having cutting edges of which the diameter is substantially the same as a width of the curved groove, comprising the steps of:

setting said milling cutter so as to perform an up milling of an inner side wall of said curved groove with respect to a center of curvature of said groove;

rotating said milling cutter in a direction against a direction of a relative feed between said milling cutter and said workpiece;

setting said milling cutter to perform a down milling of an outer side wall of said curved groove confronting said inner side wall;

providing a relative feed between said milling cutter and said workpiece to permit said milling cutter to produce said curved groove from a first end thereof to an opposite second end thereof while simultaneously milling said outer and inner side walls; and providing said milling cutter with a return movement with respect to said workpiece so as to return from said second end to said first end along said curved groove at a speed sufficiently higher than a speed at which said curved groove was produced by said milling cutter.

24. The method according to claim 23, wherein said workpiece is set so that a face thereof in which said curved groove is produce lies in a vertical plane, wherein said milling cutter is set to be rotated about a horizontal axis during the production of said curved groove, and wherein the relative feed between said milling cutter and said workpiece is controlled so that said inner side wall of said curved groove is constantly vertically positioned above said inner side wall of said curved groove.

25. The method according to claim 24, wherein said relative feed between said milling cutter and said workpiece is controlled by controlling movements supplied to said workpiece in a vertical direction and a rotational direction.

26. The method according to claim 23, wherein said workpiece is set so that a face thereof in which said curved groove is produced lies in a horizontal plane and is directed vertically downward, and wherein said milling cutter is set to be rotated about a vertical axis during the production of said curved groove.

* * * * *